Oct. 21, 1941.     J. A. HUTCHESON     2,259,565
VIBRATION MOTOR
Filed Sept. 21, 1938
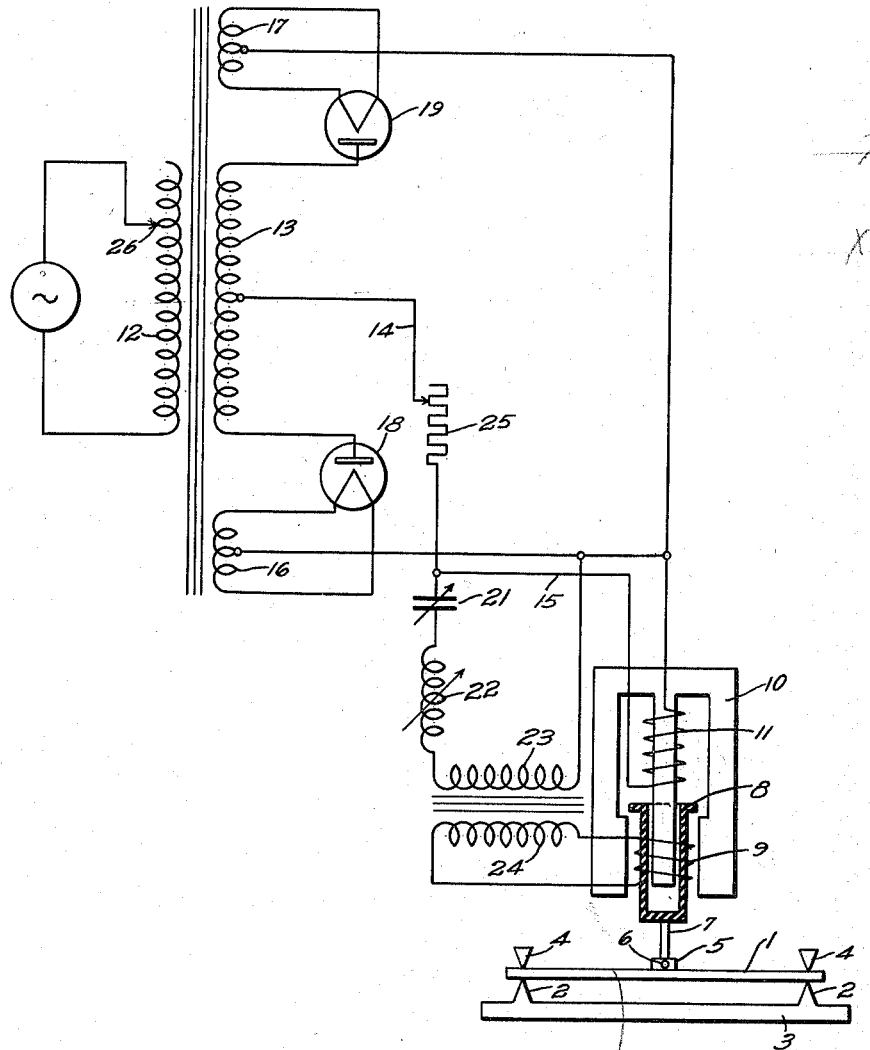
WITNESSES:
INVENTOR
John A. Hutcheson.
BY
ATTORNEY Patented Oct. 21, 1941

2,259,565

UNITED STATES PATENT OFFICE 2,259,565

VIBRATION MOTOR

John A. Hutcheson, Catonsville, Md., assignor to Westinghouse Electric & Manufacturing Company, East Pittsburgh, Pa., a corporation of Pennsylvania Application September 21, 1938, Serial No. 230,997

2 Claims. (Cl. 73—51)

My invention relates to apparatus for vibratory testing of materials and, in particular, to electrical apparatus for conducting such tests.

One object of my invention is to provide a simple arrangement for applying rapid vibratory stresses to metal or other materials to test their vibration fatigue characteristics.

Another object of my invention is to provide an arrangement by which power may be derived from alternating-current supply circuits of commercial frequencies to subject structural materials to fatigue tests under vibrations having a frequency much higher than that of the alternating-current supply.

Other objects of my invention will become apparent upon reading the following specification taken in connection with the single figure of the drawing which is a schematic diagram of a testing apparatus embodying the principles of my invention.

It is known that metals and substantially all other structural materials undergo a deterioration in mechanical strength and other physical properties when subjected to continuous vibration for long periods of time. In apparatus of the prior art for conducting such tests, the frequency of the vibration has often been relatively low. As mechanical arrangements for applying vibratory stresses to test specimens at high frequency have not been available without the expenditure of considerable sums for their construction, neither have they been of the type which could operate for the protracted periods necessary in testing without themselves undergoing mechanical deterioration. On the other hand, the length of time consumed by the tests is obviously greater the lower the frequency of vibration, and it is possible to conserve valuable time if such tests can be carried out by an apparatus capable of producing vibrations of fairly high frequency. The electric currents available from commercial power lines might conveniently be employed for carrying out vibration tests, except that their frequency of alternation is not sufficiently high to expedite these tests to the desirable degree.

I have found, however, that it is possible to obtain electric currents of two, and more, times the frequency of commercial power circuits by means of a simple arrangement of rectifiers and tuned circuits, and that a convenient device for utilizing these higher frequency electric currents for impressing vibrations of corresponding frequency on mechanical specimens can readily and economically be built.

With the foregoing principles in mind, attention is directed to the figure of the drawing in which a bar or slab 1 of any desired material which is to be subject to vibration tests is supported on a pair of knife edges 2 on a suitable foundation 3. In order to retain the bar 1 securely in position during tests, it is clamped down upon the supports 2 by means of triangular bars 4. At the center of the bar 1 is clamped or otherwise affixed a stirrup 5 through holes in which a pin 6 passes to connect with a vertical rod 7 through which the mechanical vibrations are to be transmitted to the bar 1. The rod 7 has a cylindrical extension 8 preferably of fiber or other insulation on which is mounted a winding 9. The winding 9 is thus movably positioned in the air gap of a stationary magnetic core 10 mechanically connected with said knife-edges 2 and which supports a winding 11. Electric current is supplied to the windings 9 and 11 through the electrical network shown in the figure.

The above-mentioned electrical network comprises a transformer primary 12 suitable for connection to a commercial electrical power circuit which may, for example, have a frequency of 60 cycles. The secondary 13 of this transformer has a tap at its mid point from which a conductor 14—15 extends to one terminal of the winding 11. The transformer has also two more secondary windings 16—17 which are of suitable voltage to supply current to heat the cathodes of two hot cathode electrical discharge tubes 18—19. The tubes 18—19 are preferably, although not necessarily, of the gaseous discharge type, and while I have described them as having electrically heated cathodes, it will be recognized by those skilled in the art that these tubes 18—19 may each be of the mercury pool type, in which case their cathodes would comprise mercury pools provided with side branch electrodes, these being well known in the electrical rectifier art. The anodes of the tubes 18—19 are respectively connected to the two ends of the winding 13. From the cathodes of the tubes 18—19, two conductors extend to the remaining terminal of the winding 11.

Between the latter terminal and the mid point of the winding 13 I connect in series with each other an electrical condenser 21 and a self-inductance 22 and a primary winding 23 of the transformer, of which the secondary winding 24 is connected in series with the winding 9. The capacity of the condenser 21 and the self-inductance of the winding 22, together with the self-inductance due to the magnetic circuits embodied in the primary winding 23 and the secondary winding 24 and the winding 9, are tuned to any desired harmonic of the frequency impressed on the primary of the transformer 12. If the last-mentioned circuit is tuned to the second harmonic of the frequency supplied to transformer 12, it will be found that energetic mechanical vibrations of the rod 7 are produced. On the other hand, should this second harmonic frequency not be as great as that desired for imposition upon the test bar 1, either the condenser 21 or the self-inductance 22 may be varied by methods well known in the art to tune the circuit embodying them to the third, fourth or higher harmonic of the frequency applied to the winding 12. Where sine waves of alternating voltage are impressed on the terminals of winding 12, it will usually be found that the power of the vibrations imparted to the rod 7 by a given power input to the winding 12 will decrease as the number of the harmonic to which the circuit 21—22—23 is tuned increases. In order to regulate the power input to the transformer winding 12, I may provide a variable resistor 25 in the lead 14 or I may vary the position of the tap 26 which connects one side of the alternating-current supply to the winding 12.

It will be found that the core 7 will be subjected to a vibration corresponding to the frequency of the harmonic of the alternating-current supply to which the circuit 21—22—23 has been tuned, as above described. Such vibrations will be transmitted to the test bar 1, and the latter may be kept subjected to such vibrations for substantially any desired time.

The arrangement which I have described will be seen to be relatively inexpensive to manufacture and to provide great flexibility of control both of the frequency of the vibrations imparted to rod 7 and of the power thereof. The power efficiency of the entire arrangement will also be found to be satisfactorily high.

To illustrate one specific embodiment of my invention, the test bar 1 may be of steel 6 inches long by ½ inch wide, and the length between the knife edges 2 may be 5 inches. The rod 7 may have a diameter of $\frac{7}{16}$ inch and a length of about 3 inches, its cylindrical extension being about 1½ inches long and sliding loosely over the central tongue of the magnetic core 8. This tongue may have a diameter of 1 inch and a length of 6 inches. The winding 9 may comprise 60 turns of #30 B. & S. gauge insulated wire, and the winding 11 may contain 10,000 turns of #20 B. & S. gauge copper wire. The windings 23 and 24 may be primary and secondary windings of a transformer having a rating of 5 watts at 100 volts primary, 2 volts secondary and .1 ampere primary, 5 amperes secondary. The self-inductance 22 may comprise 4,000 turns of #33 gauge B. & S. wire, and the condenser 21 may have a rating of 7 microfarads at 500 volts. The windings 12 and 13 may be, respectively, the 110 volt 1 ampere primary and the 500 volt .2 ampere secondary of a .11 kva. transformer for 60-cycle service. The tubes 18 and 19 may have a rating of .5 ampere plate current and 1,000 volts line voltage. They may, for example, be tubes type WL866 manufactured by Westinghouse Electric & Manufacturing Company, of East Pittsburgh, Pa.

In accordance with the patent statutes, I have described one specific embodiment of my invention, but the principles thereof are of broader application which will be evident to those skilled in the art. I, accordingly, desire that the appended claims shall be given the broadest interpretation of which their terms are reasonably capable.

I claim as my invention:

1. In apparatus for subjecting a material to vibration tests, a pair of windings positioned to interact magnetically, supports for said material, means for mechanically connecting one of said windings to said supports, means for connecting the other of said windings to said material, a source of current supply for said windings comprising an alternating-current transformer having a mid tap and two end terminals connected respectively to similar terminals of a pair of rectifiers, the other terminals of said rectifiers being connected together to one terminal of one of the above-mentioned windings, the other terminal of said winding being connected to said mid tap, an electrical channel containing a capacitor of the order of seven microfarads and an inductance element connected in multiple with the last-mentioned winding, and connections from the terminals of the other said winding to derive energy from said channel.

2. In apparatus for subjecting a material to vibration tests, a vibration motor comprising a magnetic circuit having an air gap, a field coil for energizing said magnetic circuit, a flexibly mounted coil positioned in said air gap, means for mechanically connecting said flexibly mounted coil to said material, a source of alternating current feeding a rectifier for energizing said field coil, and means for filtering the alternating component of the output current from said rectifier and supplying it to said flexibly mounted coil producing an alternating movement of said coil.

JOHN A. HUTCHESON.